RECORDING ELEMENT WITH MAGNETIC COATING CONTAINING A MIXTURE OF GRANULAR AND ACICULAR MAGNETIC PARTICLES

Filed Oct. 1, 1964

INVENTORS
GORO AKASHI
TOKUAKI MIYAKE
MASAAKI FUJIYAMA
BY Buckman and Archer
THEIR ATTORNEYS

United States Patent Office 3,389,014

Patented June 18, 1968

3,389,014

RECORDING ELEMENT WITH MAGNETIC COATING CONTAINING A MIXTURE OF GRANULAR AND ACICULAR MAGNETIC PARTICLES

Goro Akashi, Tokuaki Miyake, and Masaaki Fujiyama, Kanagawa-ken, Japan, assignors to Fuji Shashin Film Kabushiki Kaisha, Kanagawa-ken, Japan, a corporation of Japan Filed Oct. 1, 1964, Ser. No. 400,833

1 Claim. (Cl. 117—93.2)

ABSTRACT OF THE DISCLOSURE

A magnetic record having a support coated with a magnetic layer consisting of a binder and mixture of acicular ferromagnetic particles and granular ferromagnetic particles.

This invention relates to an improved magnetic recording element and more particularly it relates to an improved magnetic recording tape suitable for use, in particular, in video systems.

According to this invention, by using a mixed system of acicular particles and granular particles as the magnetic material in a magnetic recording element having a magnetic layer prepared by dispersing in a binder gamma-hematite (gamma-$Fe_2O_3$), magnetite ($Fe_3O_4$), metallic iron, or an iron-cobalt alloy, the surface properties of the magnetic layer are improved and at the same time the practical S/N ratio (signal to noise ratio) is improved by providing a low noise property inherent to the granular particles and a high sensibility inherent to the acicular particles.

This invention is concerned with a magnetic recording element wherein a mixture of acicular magnetic particles and granular magnetic particles having a grain size equal to or less than the short diameter of said acicular particles in a volume ratio of 3:1 to 1:3 is dispersed in a binder. Further, the invention includes applying to the above-mentioned mixture system, a magnetic-field orientation treatment. That is, when the mixture of the acicular particles and the granular particles is oriented in a magnetic-field in the case where the mixture is applied, as a dispersion in a binder solution, on a support such as a plastic base or tape, the thus obtained magnetic recording element has a high recording sensitivity that is almost the same as in the case where only acicular particles are used; even though the element contains granular particles. At the same time the noise level of the recording element is reduced by the presence of the granular particle, which results in producing a magnetic recording element having a high S/N ratio. In this case, the granular particles are filled in gaps among the acicular particles, which improves the density of the magnetic particles as well as improving the smoothness of the surface of the magnetic layer. In particular, when the magnetic layer is subjected to an orientation treatment in magnetic field, the granular particles present between or among the acicular particles are oriented stably and in a line, and the oriented state developed under the magnetic field is maintained in situ in a stable state after the magnetic field is removed.

The invention will be explained in more detail below, with reference to the accompanying drawings, wherein.

Figure 1A:
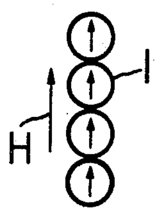
FIGS. 1A and 1B show the states of granular particles in a magnetic field and outside a magnetic field, respectively.
Figure 1B:
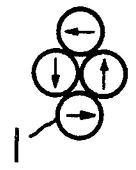

In the case of producing a magnetic recording element by using conventional granular particles as the magnetic material, the particles are applied with a suitable binder on a support and, before the magnetic layer is dried, the magnetic particles are subjected to an orientation treatment by passing them through a magnetic field. In the magnetic field H, the granular particles 1 are oriented in a line to the direction of the magnetic field as shown in FIG. 1A, but if the granular particles leave the magnetic field H, each granular particle takes its most stable arrangement as shown in FIG. 1B and is fixed in that state, which results in greatly reducing the effect of the orientation treatment.

Figure 2A:
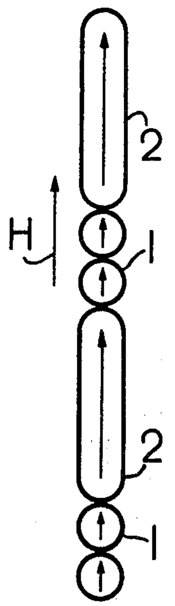
FIGS. 2A and 2B show the states of the particle mixture of this invention in a magnetic field and outside a magnetic field respectively.
Figure 2B:
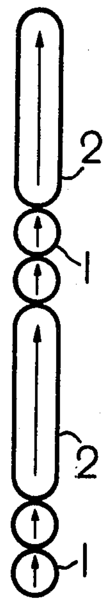

In this invention, however, the mixed granular particles 1 and the acicular particles 2 are oriented to one direction in a magnetic field H as shown in FIG. 2A and after the particles leave the magnetic field and are outside the influence of the magnetic field, the granular particles reside in the stable state shown in FIG. 2B by the presence of the acicular particles; that is, the granular particles take the oriented state as shown in B as a stable state in energy, and the particles are fixed in the state, which improves the effect of the orientation treatment.

As the acicular particles to be used in this invention, ones prepared by the following methods may be adopted.

(I) Acicular magnetite ($Fe_3O_4$) particle prepared by the dehydrating reduction of goethite (gamma-FeOOH), or a gamma-hematite (gamma-$Fe_2O_3$) particle introduced from the magnetite particle or a mixture of it with other metal ion.

(II) Acicular gamma-hematite (gamma-$Fe_2O_3$) particle prepared by the dehydration of lepidocrosite (gamma-FeOOH) or a mixture of it with other metal ion.

(III) An iron-cobalt-nickel particle prepared by the reduction of an aqueous solution containing salts of iron, cobalt and nickel with a borohydride, such as sodium borohydride.

(IV) Acicular metallic iron particle obtained by the hydrogen reduction of goethite or lepidocrosite.

As the granular particles, one may use: gamma-hematite, magnetite, cobalt ferrous ferrite, cobalt-containing gamma-hematite, granular metallic iron particles, iron-cobalt alloy particles, iron-cobalt-nickel alloy particles and the like. In this case, however, it is confirmed by the results of experiments that the grain size of the granular particle must be less than the short diameter of the acicular particle. Also, the preferred mixing ratio of the acicular particle to granular particle is 1:3 to 3:1 in volume ratio.

Further, the average grain length of the acicular particles is preferably less than 5 microns and if the average grain length is longer than 5 microns, the coated surface becomes rough and the S/N ratio is reduced.

The invention will be further illustrated but is not intended to be limited by the following examples.

Example 1

As an acicular particle, gamma-hematite prepared by the dehydrating reduction of goethite followed by reoxidation, having a grain size of $0.8\mu$ x $0.15\mu$ x $0.15\mu$ and a coersive force (iHc) of 280 oe. was used and as a granular particle, a granular cobalt-containing gamma-hematite particle having an average gain size of $0.2\mu$ and a coersive force (iHc) of 290 oe. was used. A dispersion of a mixture of these two kinds of magnetic particles in a binder solution was applied on a support and subjected to an orientation treatment in a magnetic field to give a magnetic recording tape of 6.25 mm. in width. The bias-output characteristics of such magnetic recording tapes prepared by varying the mixing ratio of the magnetic particles are shown in FIG. 3 and the S/N ratios and sensitivities are shown in the following table.

Figure 3:
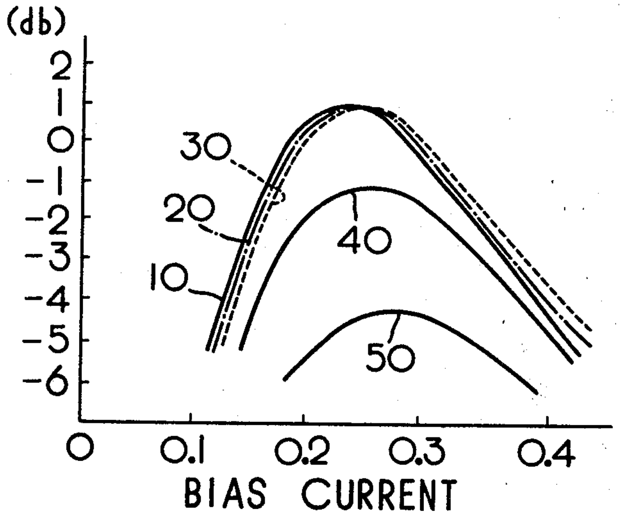
FIG. 3 is a curve showing the sensitivity (db) to the bias current of the materials of this invention and conventional materials.

| | Acicular:granular (vol. ratio) | Sensitivity (db) | S/N ratio (db) |
|---|---|---|---|
| Curve in Fig. 3: | | | |
| 10 | 1:0 | 0 | 54.0 |
| 20 | 3:1 | −0.2 | 55.0 |
| 30 | 1:1 | −0.3 | 56.5 |
| 40 | 1:3 | −2.1 | 57.0 |
| 50 | 0:1 | −5.0 | 58.0 |

As shown in the example, the combination of both particles having almost same coersive forces gives sharper bias-output curve and shows a higher sensitivity.

It should be noted in the results shown in FIG. 3 and the table, that the sensitivity in the bias-output characteristic is scarcely reduced when the mixing ratio of the acicular particle to the granular particle is less than 1:1 in a volume ratio, and the reduction of output is only 2.1 even when the mixing ratio is 1:3. This indicates that whereas the sensitivity in the case of using only granular particles is —5.0 db, the sensitivity is increased to 2.9 db by the addition of the acicular particles in an amount of only ¼ of that of granular particles. On the other hand, the signal to noise ratio is increased steadily to 55 db with the mixing ratio of 3:1, to 56 db with the mixing ratio of 1:1, and to 57 db with the mixing ratio of 1:3, as compared with 54 db of the case of using only the acicular particles. Hence, it is clear that the mixing system of the acicular particles and granular particles in this invention has the merits of both particles at the same time. A similar tendency is seen in a mixing system of metallic iron acicular particles or iron-cobalt alloy acicular particles and granular particles. The effect of this invention is most remarkable in a mixing ratio of the acicular particles and the granular particles being 3:1 to 1:3. As the results of investigations about the mutual relation of the grain size of the acicular particle and the average grain size of the granular particle, it has been found that the granular particle must be a fine particle having an average grain size nearly equal to or less than the average short diameter of the acicular particle.

While there has been described in the foregoing what may be considered to be preferred embodiments of this invention, modifications may be made therein without departing from the spirit and the scope of this invention as shown in the following claims.

What is claimed is:

1. A magnetic recording element having on a support a magnetic layer consisting of a binder and a mixture of acicular ferromagnetic particles and granular ferromagnetic particles dispersed therein in a volume ratio of 3:1 to 1:3, said acicular particles having an average grain length less than 5 microns, said granular particles having an average grain size nearly equal to or less than the average short diameter of said acicular particles, and further said magnetic layer having been subjected to an orientation treatment in a magnetic field.

References Cited

UNITED STATES PATENTS

| | | | |
|---|---|---|---|
| 2,541,136 | 2/1951 | Warren | 274—41.4 |
| 2,936,286 | 5/1960 | Feick et al. | 252—62.54 X |
| 2,941,901 | 6/1960 | Prill et al. | 117—76 |
| 2,956,955 | 10/1960 | Arthur | 252—62.54 X |
| 3,047,505 | 7/1962 | Miller | 252—62.54 X |
| 3,093,039 | 6/1963 | Rheinfrank | 95—1.7 |
| 3,198,603 | 8/1965 | MacCallum et al. | 252—62.53 |
| 3,216,846 | 11/1965 | Hendrix et al. | 117—62 |
| 3,221,315 | 11/1965 | Brown et al. | 340—174.1 |

WILLIAM D. MARTIN, *Primary Examiner.*

MURRAY KATZ, *Examiner.*

W. D. HERRICK, *Assistant Examiner.*